Inventor
Donald R. Huff
By Wallace, Kinzer and Dorn
Attorneys

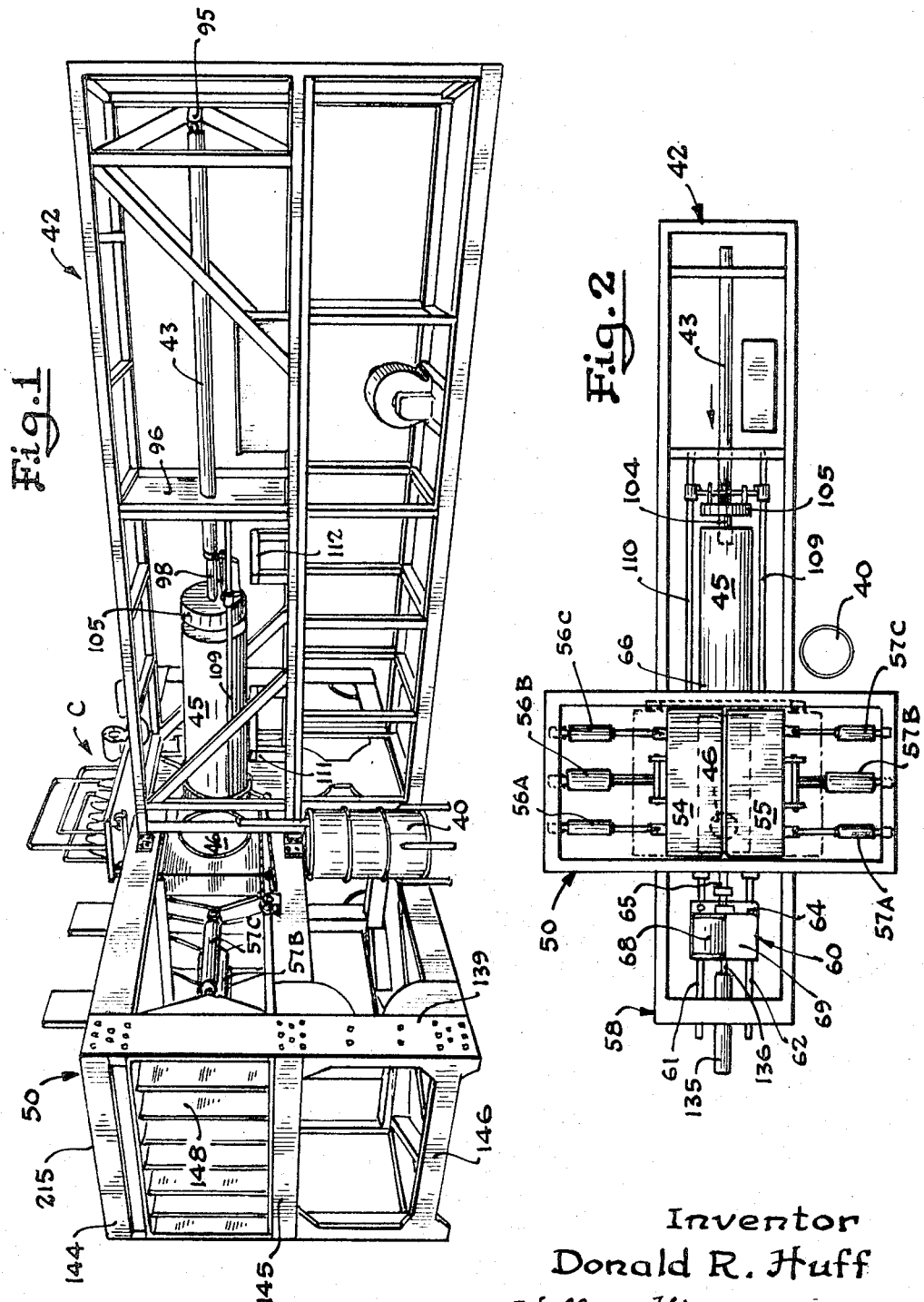

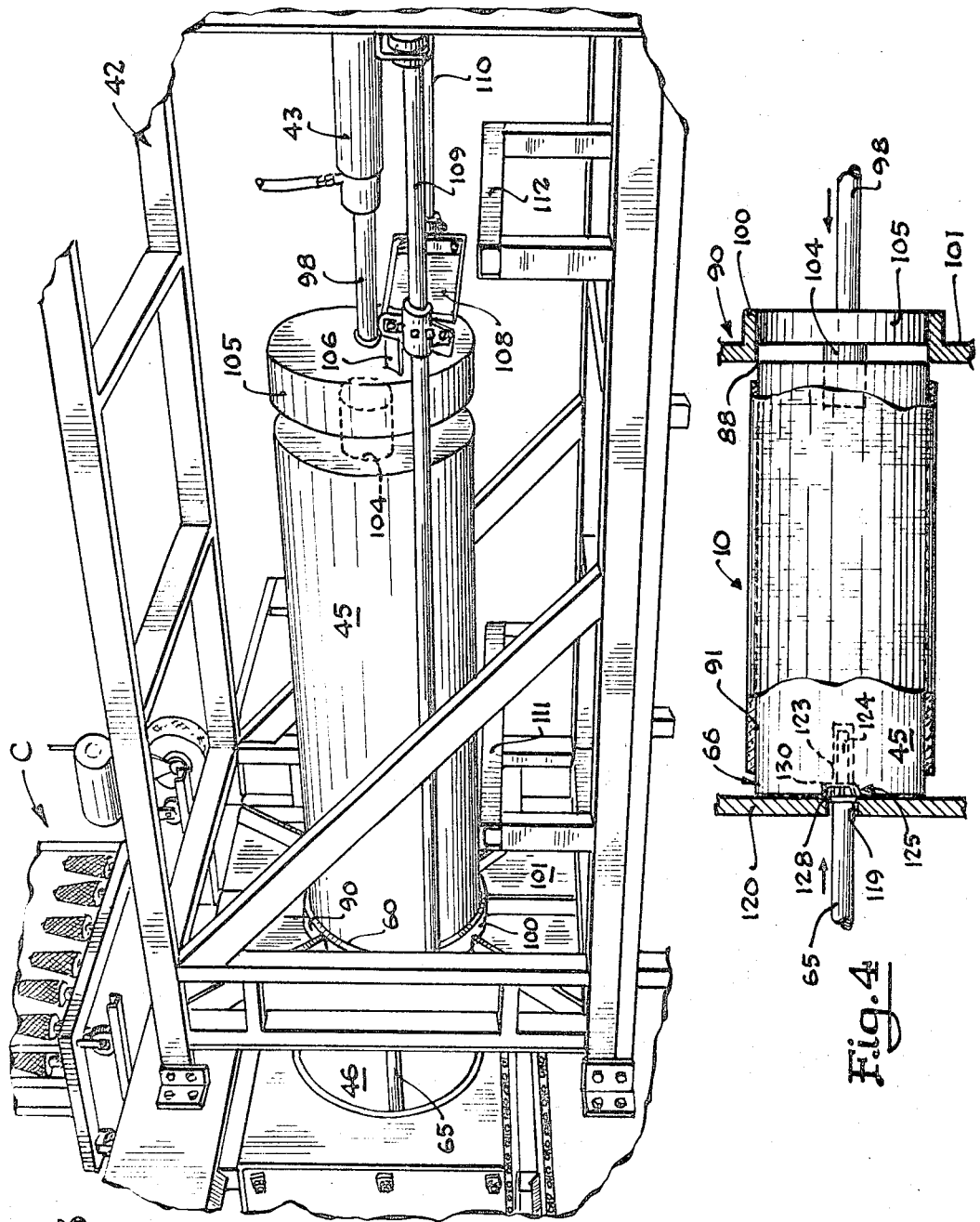

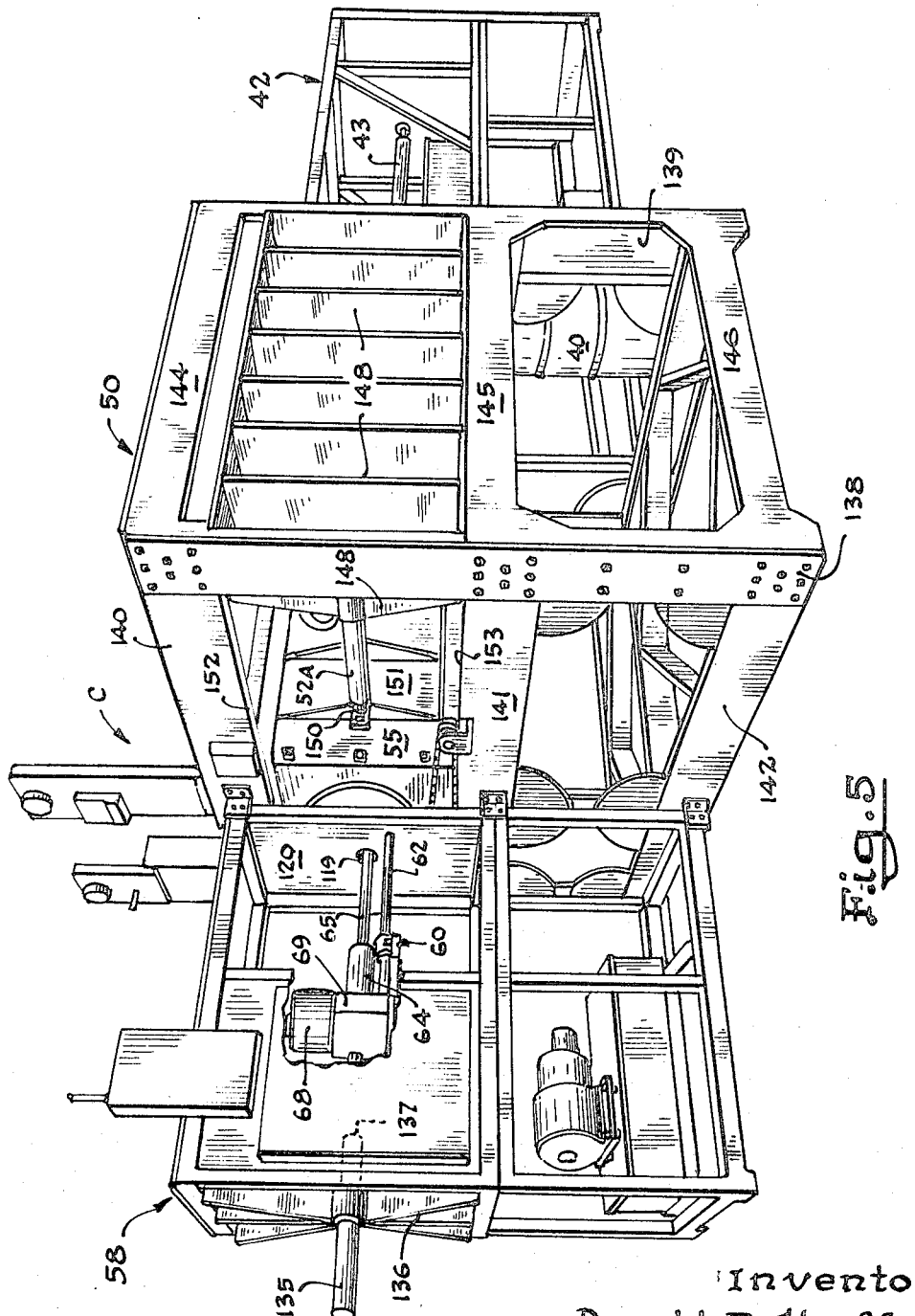

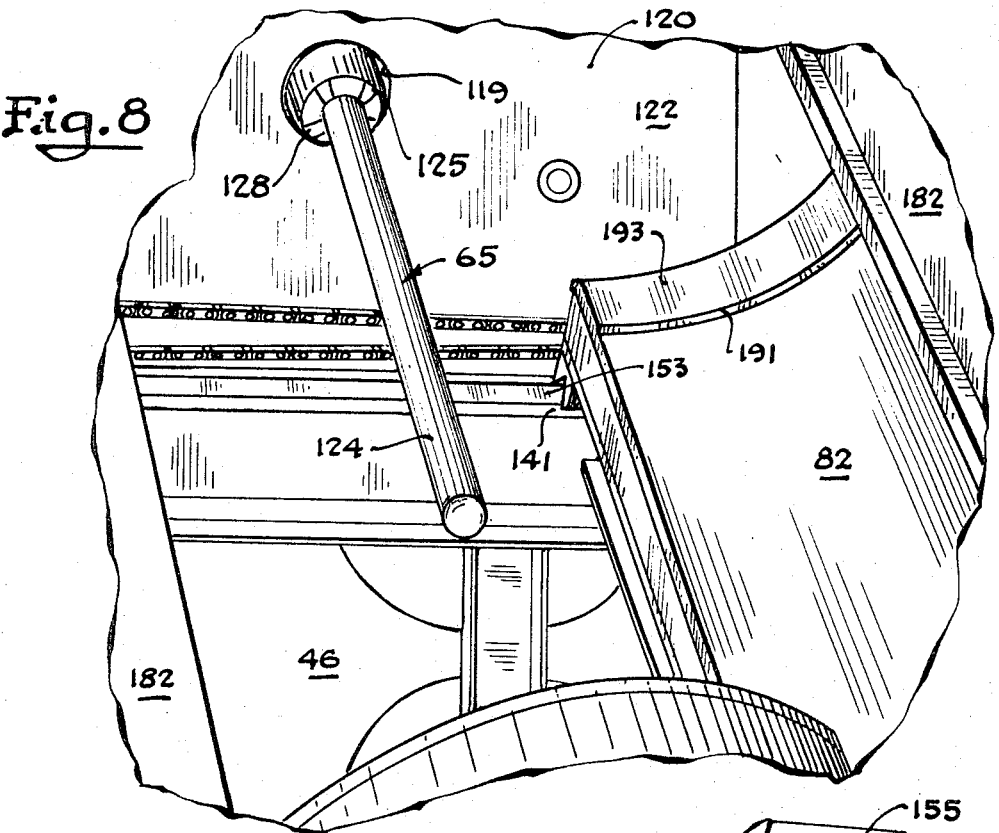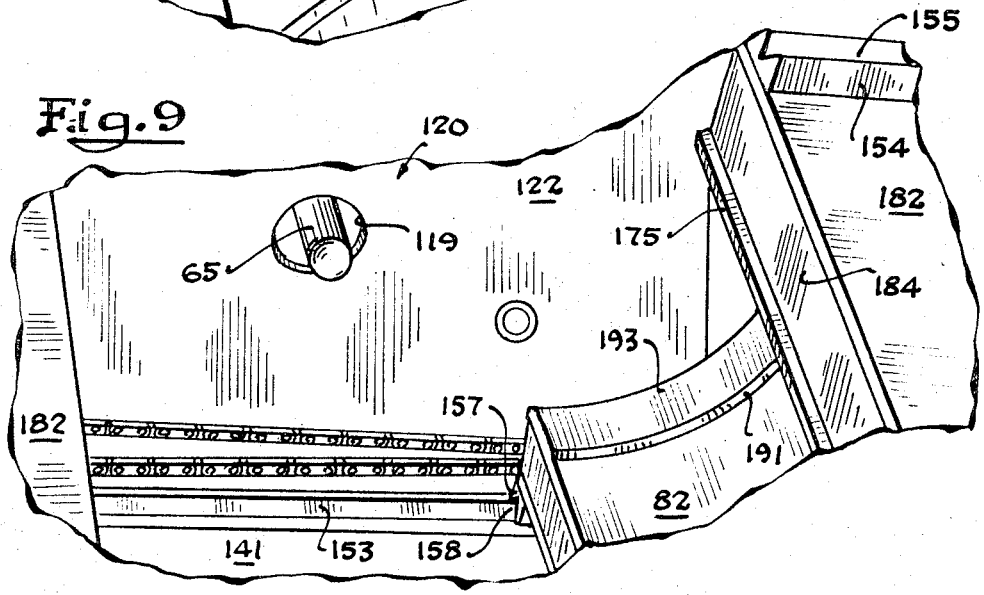

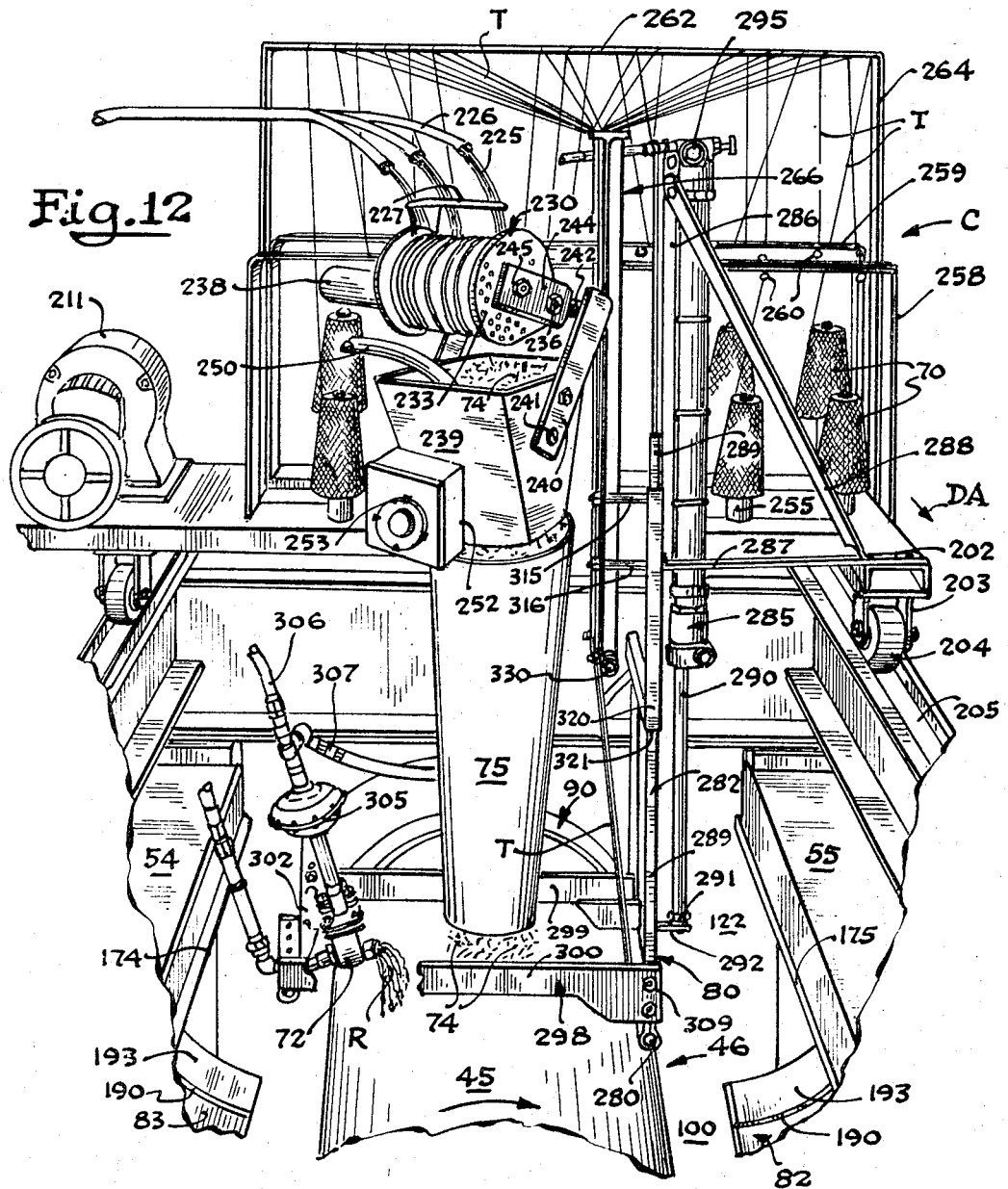
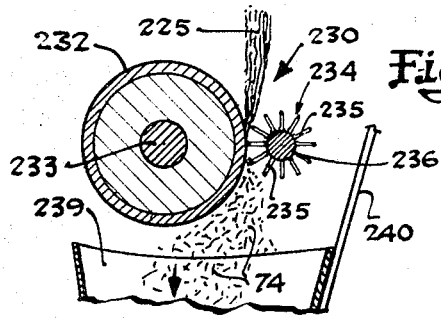

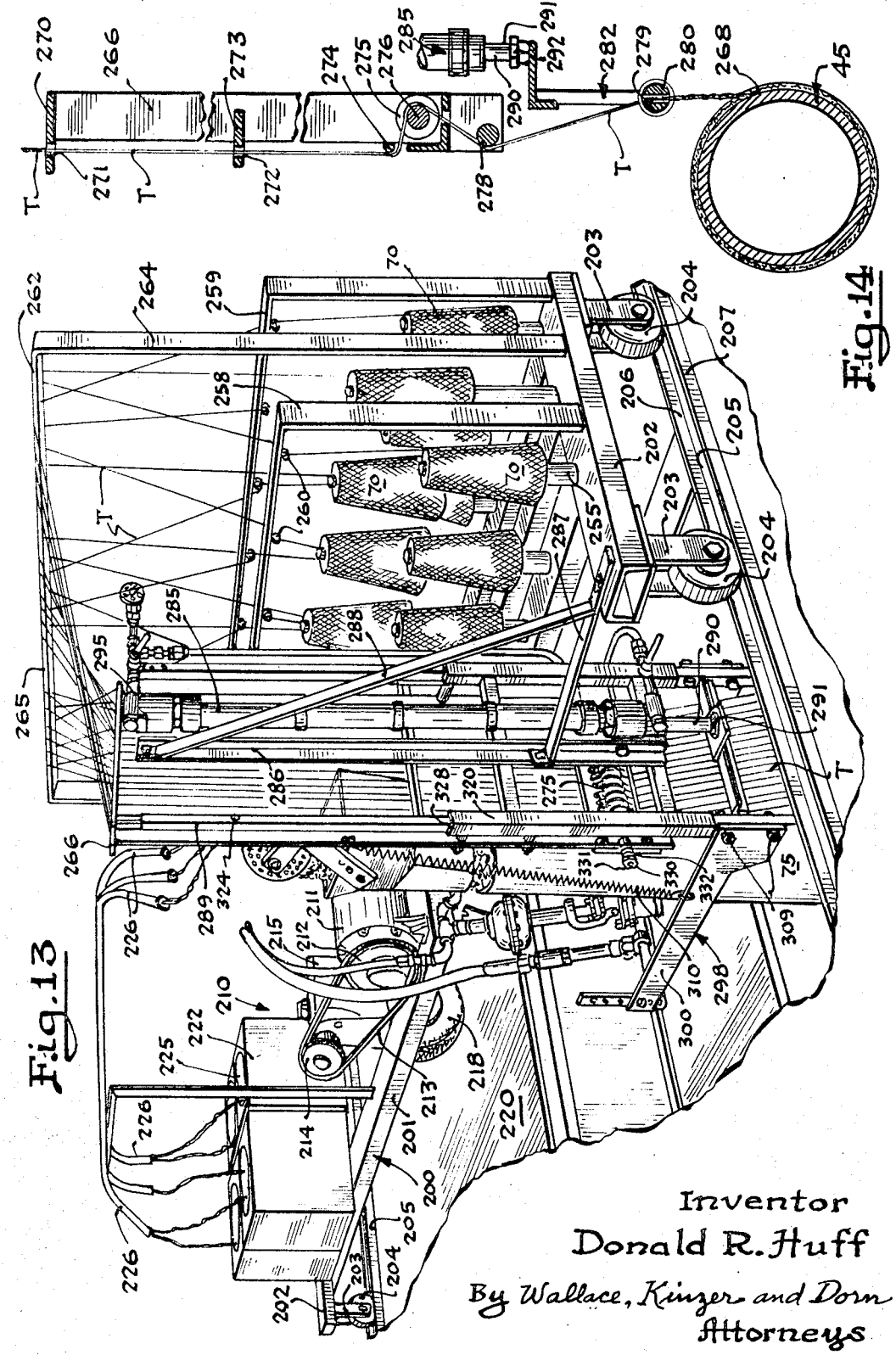

Inventor
Donald R. Huff
By Wallace, Kinzer and Dorn
Attorneys

June 10, 1969     D. R. HUFF     3,449,188
METHOD AND APPARATUS FOR PRODUCING MOLDED HOLLOW ARTICLES
Filed Aug. 18, 1965     Sheet 10 of 11

Inventor
Donald R. Huff
By Wallace, Kinzer and Dom
Attorneys

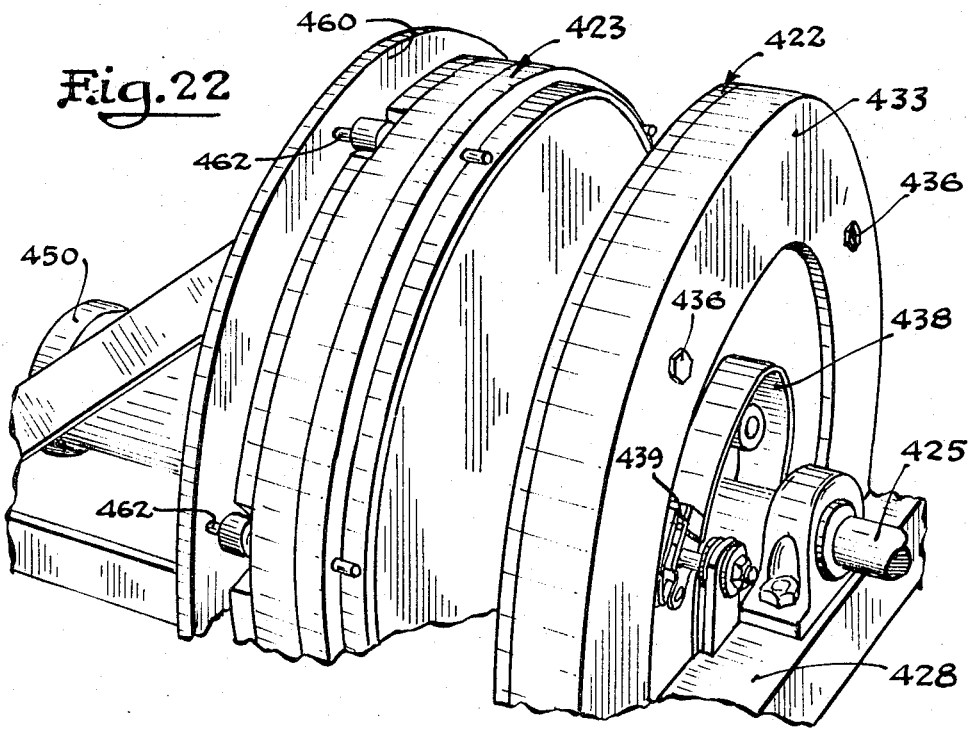
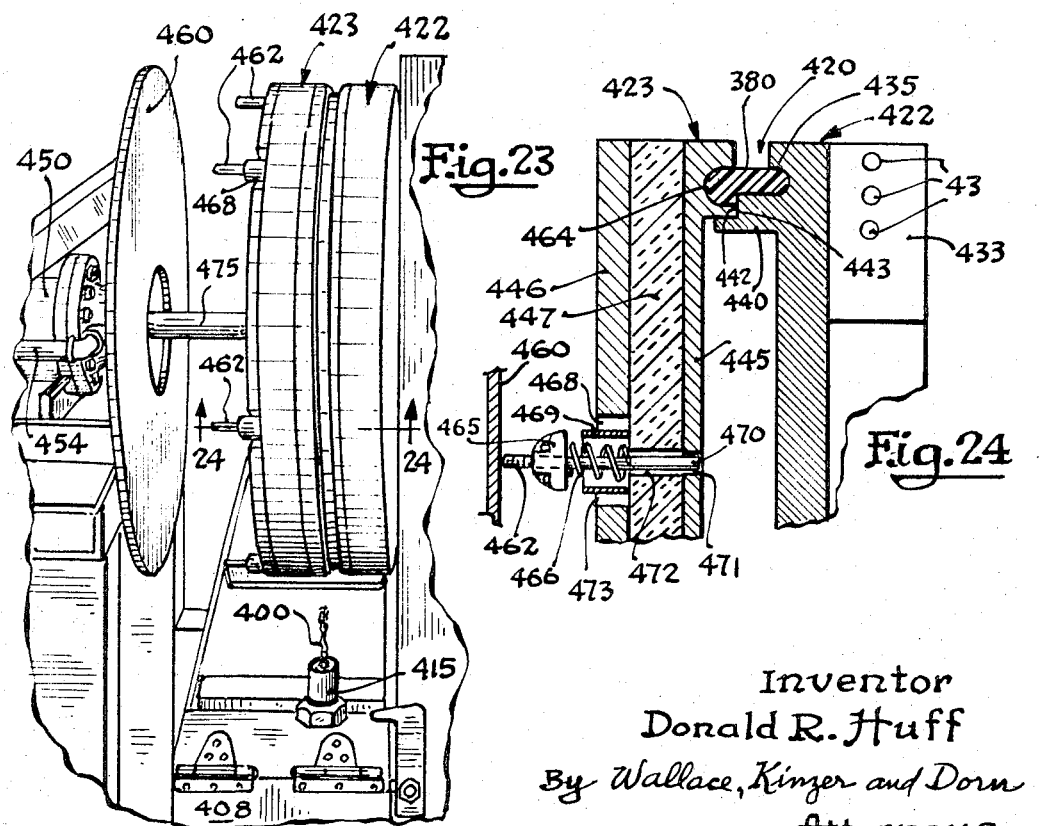

United States Patent Office 3,449,188
Patented June 10, 1969

3,449,188
METHOD AND APPARATUS FOR PRODUCING MOLDED HOLLOW ARTICLES
Donald R. Huff, Springfield, Mo., assignor to Ozark Reconditioning Company, Springfield, Mo., a corporation of Missouri
Filed Aug. 18, 1965, Ser. No. 480,709
Int. Cl. B31c *13/00;* B65h *81/00*
U.S. Cl. 156—173                              12 Claims

ABSTRACT OF THE DISCLOSURE

Tubular bodies such as drums or the like are molded from strands and chopped rovings in a matrix such as a thermosetting resin binder. The rovings, strands and binder are deposited on a mandrel-type die, the strands being wound thereon under tension. Afterwards, a pair of normally open matched dies, on opposite sides of the mandrel, are closed to confine the materials on the mandrel for molding. Closure of the matched dies breaks the strands at the unused length; this releases the tension in the wound strands so that all the materials are molded entirely under compression.

---

This invention relates to a method of and apparatus for producing molded articles such as containers.

The present invention is particularly adapted to the large scale production of molded articles having a hollow interior such as a cylinder, a tank, a drum or like article having embedded reinforcing fibers disposed in a thermosetting or plastic bonding material. The method and apparatus are particularly adapted for production of large cylinders or sleeves having a continuous wall composed of glass fibers and strands embedded within a thermosetting matrix to afford a strong, water-tight and chemically resistant cylinder, and so to do is the primary object of the present invention.

Heretofore, many molded articles have been reinforced with woven mats of fibers which are impregnated by a thermosetting resin or epoxy material. The present invention eliminates the necessity for employing woven mats of fiber glass material, and reduces material and fabricating costs by a novel process of using chopped fiber glass rovings intermingled and interlocked in a random manner in conjunction with continuous glass strands.

Another object of the invention is to produce molded articles having embedded reinforcing fibers by a novel process and apparatus employing a central male die member and a match compression molding technique for curing a thermosetting matrix material on the male die member.

Another object of the invention is a novel process for making glass fiber reinforced molded articles. More specifically, and as a further object of the invention, glass rovings are chopped into discrete, relatively small glass fibers and deposited on a rotatable member which is wetted with a thermosetting resin, and glass strands are wound convolutely about the rotatable die member preparatory to the curing by matched die members confining under pressure the materials fed to the rotatable die member, the molded article being stripped from the rotatable die member after curing of the bonding agent.

The present invention also has as an object a novel drum or container formed of a body, a cover and a ring, each composed of a thermosetting material being reinforced by glass elements therein, and each being bondable to one another by a suitable cement.

Annother object of the invention is a novel manner of producing a bead or annular member of a thermostat material having continuous strands of glass embedded therein. More specifically, and as a further object of the invention, glass rovings are coated with a thermosetting material and are wound about the periphery of a rotatable die while under tension and while heat is applied thereto to cure said thermosetting material with said rovings embedded therein.

In accordance with the preferred embodiment of the invention, a plurality of glass rovings are fed to a chopper which breaks the rovings into fiber elements which are deposited on a rotating die member. Simultaneously, a continuous stream of thermosetting resin is applied to the surface of the rotating die member, and concurrently a series of continuous strands or threads of glass are also wound convolutely about the rotating die member to become intermingled or intermixed with the chopped rovings and thermosetting resin. Matched press plates constituting die members are then fitted about the rotatable die to confine the materials fed thereto, and heat is applied to cure the thermosetting resin. The now-molded article is then stripped from the supporting die member.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention.

In the drawings:

FIG. 1 is a perspective view of an apparatus adapted to practice the method of making molded articles in accordance with the preferred embodiment of the invention;

FIG. 2 is a diagrammatic and plan view of the apparatus of FIG. 1;

FIG. 3 is an enlarged perspective view of the rotatable die in its retracted position prior to insertion into the molding station;

FIG. 4 is a diagrammatic view of the rotatable die prior to having a molded article stripped therefrom;

FIG. 5 is a perspective view of the apparatus showing the driving carriage for the rotating die;

FIG. 8 shows the interior of the molding station with the driving shaft for the rotatable die disposed in driving position and with matched press dies in their open position;

FIG. 9 shows the driving shaft of FIG. 8 in its retracted position;

FIG. 12 illustrates the molding station and disposition of the threads, chopped rovings and resin as they are respectively being applied to the rotating die;

FIG. 12A illustrates the chopping of the rovings to make the fibers for the molded article;

FIG. 13 illustrates an overhead carriage;

FIG. 14 is a sectional view showing the manner of feeding the threads to the rotating die;

FIG. 22 is an enlarged view of the apparatus of FIG. 19;

FIG. 23 illustrates the die members in their closed position for forming the ring; and FIG. 24 illustrates forming of the ring in the die members of the ring-forming apparatus.

GENERAL DESCRIPTION OF FIGS. 1–14

Figure 6:
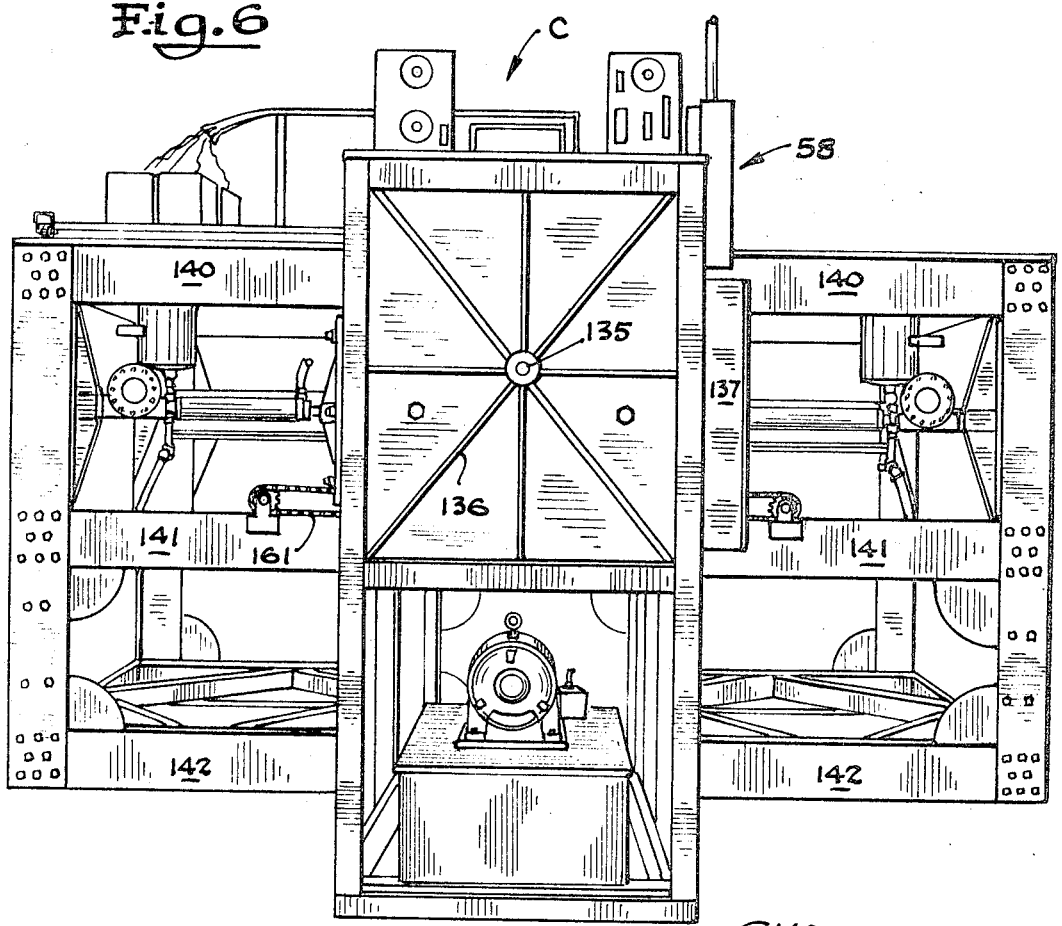
FIG. 6 is an elevational view of the apparatus of FIG. 1.

Referring to FIGS. 1, 2 and 3, there is illustrated an apparatus for forming molded articles having embedded strands and fibers of glass in a thermosetting matrix material, but of course equivalent materials can be used. More particularly, the apparatus shown in FIG. 1 is adapted to take raw materials of glass strands in the form of threads and rovings and thermosetting resin from a tank 40, FIG. 1, and to form therefrom a finished cylindrical container or like article of approximately six feet in length and having a wall thickness of approximately ⅛ inch. The finished article has glass fibers disposed in a random orientation embedded throughout the ⅛ inch thickness of wall, and has convolute strands of continuous glass threads wound in a spiral manner throughout the entire body of the article.

To make such relatively large containers, considerable molding pressures in the order of 320 pounds per square inch are applied and the equipment is relatively massive in size as can be appreciated from the illustration of FIG. 1. A large reinforced frame structure composed of steel plates and channel members affords a stationary supporting frame 42 for supporting a hydraulic cylinder 43 which serves to reciprocate a large rotatable die member 45 into and from a molding station 46 within a transverse frame 50.

As best seen in FIG. 2, the transverse frame 50 supports and guides a pair of match die members 54 and 55 which are moved into closed engagement to exert approximately 320 pounds of pressure per square inch on the resin material on the rotatable die member 45. To generate such pressures, three hydraulic cylinders 56A, 56B and 56C are attached to the match die 54 and three hydraulic cylinders 57A, 57B and 57C are attached to the match die 55.

Also as best seen in the left-hand portion of FIG. 2, a further frame 58 is adapted to support a motor carriage 60 on a pair of spaced rails 61 and 62. The motor carriage has a driving shaft 65 which is adapted to be moved into driving engagement with a driven end 66 of the rotatable die member 45 to rotate the same as will be described in greater detail hereinafter.

While not shown in FIG. 2, but as plainly seen in FIGS. 1 and 3, there is provided an overhead carrier C, which is adapted to move across the molding station 46 to supply the threads T of glass from a plurality of spools 70, FIG. 12. Also, the carrier C is shown in its operative position in FIG. 12 for dispensing the materials forming the wall of the molded article. More particularly, the rotatable die member 45 is shown in its operative position within the molding station 46 for receiving on its upper surface a controlled amount of resin R from a resin feeding nozzle 72 adjacent the surface of the rotatable die member 45, which is rotating in a clockwise direction. The thermosetting resin R will be applied to the mandrel or die 45 just prior to the depositing of chopped rovings or fibers 74 from a funnel 75. The chopped rovings 74 are carried in a clockwise direction during rotation of the die member 45 to be wrapped by a plurality of threads T from the spools 70.

The thermosetting resin is preferably either a polyester resin or an epoxy resin of commercially available manufacture. A typical catalyst or curing agent for the polyester resin is 50% benzol peroxide with tricresyl phosphate, 1% by weight of the bonding resin.

The threads T are suitably hooked to the male die member 45. As the die member 45 rotates, the threads T are pulled downwardly from the carriage C. Thus, the threads T are wrapped about the die. Simultaneously with rotation of the rotatable die member 45, the carriage C is moved forwardly in the direction of the arrow DA, FIG. 12, at a controlled rate, and these combined movements cause the threads T to be wound in a convolute manner about the periphery of the die member 45. The velocity of movement of the carriage and the rate of discharge of the resin R is calibrated in accordance with the desired wall thickness and density of the finished product.

Figure 11:
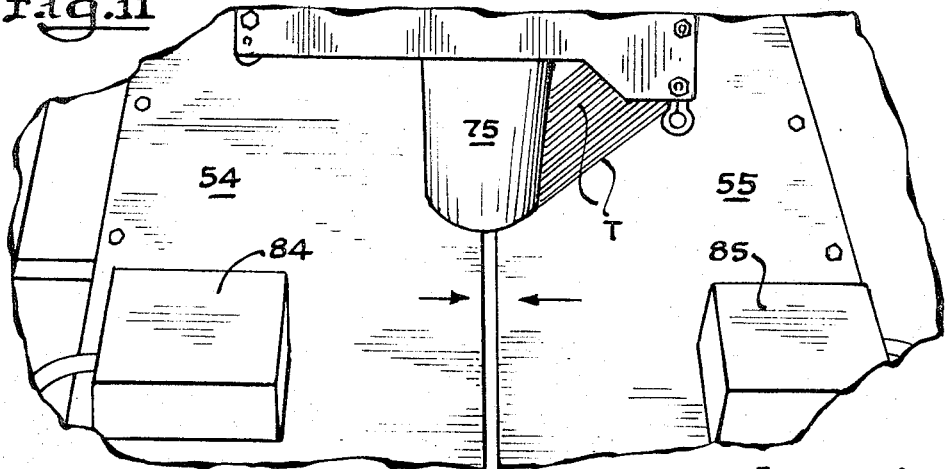
FIG. 11 illustrates the closing of the matched press dies to cut threads.

After the carriage C has traversed across the desired length of die member 45, the opposed match plate dies 54 and 55 are moved toward a closed position, as seen in FIG. 11, to sever the threads T which are still attached to the rotatable die member 45. The match dies 54 and 55 engage and compress the composite material on the die member 45 at a pressure of approximately 320 pounds per square inch.

Figure 10:
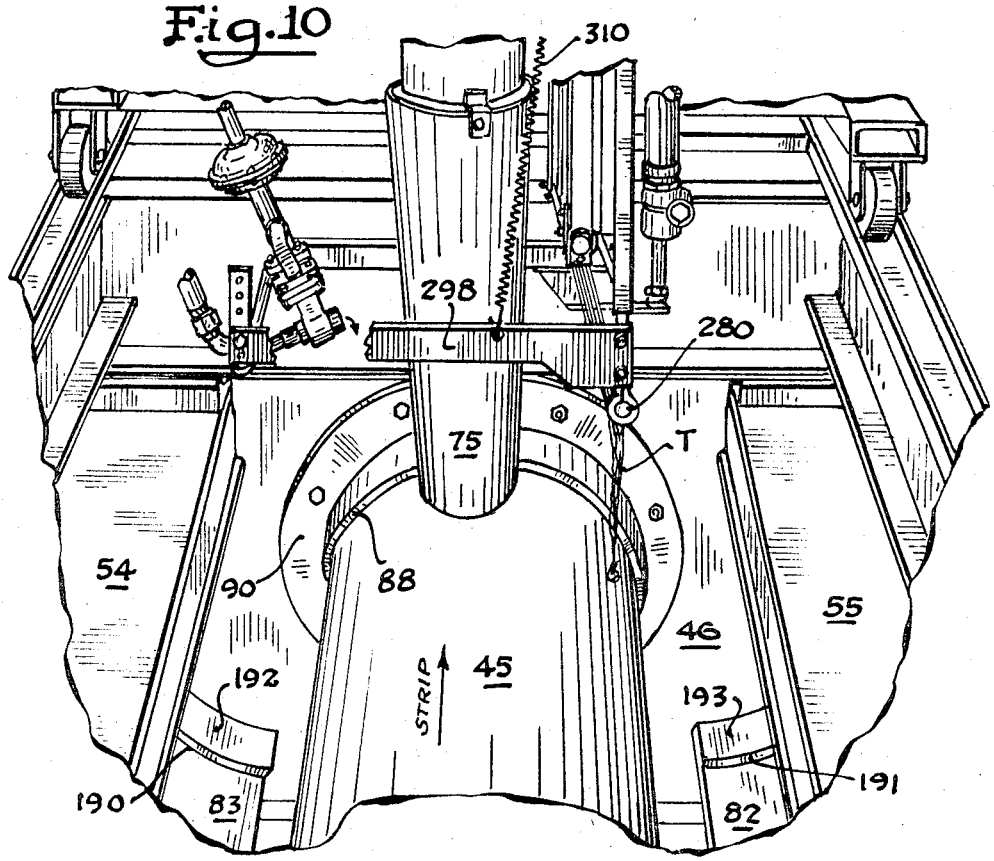
FIG. 10 illustrates the stripper die and rotatable die.

As best seen in FIGS. 8, 9 and 10, the interior surfaces 82 and 83 of the respective match dies 54 and 55 are curved substantially concentrically with the rotatable die member 45 and press the material thereagainst. Simultaneously, heater elements associated with the match dies 54 which are controlled by control elements 84 and 85, FIG. 11, on the match press dies 54 and 55, supply sufficient heat to the resin material to cure the same while subjected to high pressure. Manifestly, the temperature to which the resin material is raised while curing and the amount of pressure employed and the time of heating and pressure application are varied in accordance with the type of thermosetting resin and its curing properties.

After the cylindrical article 10, FIG. 4, has been molded, the rotatable die member 45 is withdrawn from the molding chamber 46, FIG. 10, while the molded article 10 engages the peripheral edge 88 of a stripping die 90. A stripping force in the order of 15,000 pounds has been found sufficient to break the adhesion between the interior bore or surface 91 of the cylindrical article and the outer peripheral surface of the rotatable die member 45. Thereafter, the article 10 may be removed from the die cavity 46 and a new cycle may be commenced to form another article.

The molded cylindrical article 10 has a thermoset wall reinforced with fibers 74 randomly oriented throughout the wall and affording strength in all planes. The chopped fibers 74 provide a smooth inner and outer wall surface with the resin and glass strands. The threads T are relieved of tension during the curing cycle. The rovings are inexpensive as compared to the preformed mats of glass employed in the conventional drums.

DETAILED DESCRIPTION

As best seen in FIG. 1, the cylinder 43 for reciprocating the rotatable die 45 is secured at its rearward end 95 to the frame 42 and is supported forwardly and in a generally horizontal plane by a support wall 96. The cylinder 43 is a considerably long hydraulic cylinder and is double-acting to reciprocate its piston (not shown) and its piston rod 98. The piston rod 98 moves the rotatable die 45 leftwardly and into the molding station 46 when piston rod 98 is extended; and the piston rod 98 retracts the rotatable die 45 when the piston rod 98 moves inwardly of the cylinder housing 43.

When the large die member 45 is disposed outwardly of the molding station 46 as seen in FIGS. 1 and 3, its leftward and driven end portion 66 is supported in an outer portion 100, FIG. 3, of the stripper die 90 at an end wall 101 of the molding station 46. That is, the left-hand portion 66 of the rotatable die 45 is supported by an arcuate sleeve 100 on the wall 101.

The right-hand portion of the rotatable die 45 is supported on a shaft portion 104, FIGS. 2 and 3, of a support disc 105 which in turn is secured by brackets 106 to a slide 108 mounted between a pair of spaced tubes 109 and 110. Thus, the weight of the right-hand portion 45 of the rotatable die member 45, as seen in FIG. 3, is supported by the spaced guide tubes 109 and 110. It is preferred that the piston rod 98 be secured to the non-rotatable support disc 105 to reciprocate the die member 45, and that the piston rod 98 be free of the weight of the die member 45.

As a protective measure, a pair of spaced stands 11 and 112, FIGS. 1 and 3, are disposed beneath the rotatable die 45 when it is fully retracted. That is, the stands 111 and 112 are safety stands which would support the rotatable die 45 in case it was dropped because of failure of the slide carriage 108 or other of its supporting elements such as the guide tubes 109 and 110.

As the piston rod 98 extends leftwardly as viewed in FIG. 3, the die 45 is advanced into the molding station 46, and the slide 108 moves along the slide tubes 109 and 110. With the die 45 fully inserted, the supporting disc 105 is then positioned in the stripping die 90.

Simultaneously with movement of the die 45 into the molding station 46, a fluid motor means including a fluid cylinder 135, FIG. 2, has fluid under pressure applied thereto to extend its piston rod 136 to force the motor carriage 60 rightwardly along slides 61 and 62, FIG. 2. Resultantly, the drive shaft 65 moves through an aperture 119, FIG. 5, in a molding station end wall 120, FIG. 4, which wall 120 is opposite the molding station wall 101.

As seen in FIG. 8, the forward end 124 of the drive shaft 65 extends for a considerable distance into the molding station or chamber 46. This end 124 of the drive shaft extends into a central bore 123, FIG. 4, in the leftward driven end 66 of the rotatable die 45. A collar or coupling 125 on the drive shaft 65 has its forward edge splined at 128 for mating engagement with the complementary splined surface 130, FIG. 4, disposed concentrically about the bore 123 in the end wall portion 66 of the rotatable die 45. Thus, as the drive shaft 65 rotates, the meshed splined surfaces 128 and 130 cause the die member 45 to rotate.

The drive shaft 65 is journaled for rotation in a bearing support 64 on the carriage 60, FIG. 5, driven by a motor 68 and a gear reducer 69 connected to the shaft 65. The forward end 124 of the shaft 65 supports the leftward end 66 of the die 45, and the shaft 65 is in turn supported by the bearing mount 64 and a bearing within the gear reducer 69. Both the bearing mount 64 and gear reducer 69 are mounted on the carriage 60 as is the motor 68.

The cylinder means 135 for moving the carriage 60 along the slides 61 and 62 is supported on a rear plate of the frame 58 provided with a plurality of spaced stiffening supports 136, FIG. 5. A piston rod 137 extends between the cylinder 135 and the carriage 60 for reciprocating the carriage 60 and the rotatable drive shaft 65.

Also as seen in FIG. 5, the transverse frame 50 supports and guides the match die 55 for reciprocal movement. The transverse frame 50 includes at its outward ends a pair of upstanding vertical support members 138 and 139, to which are secured three spaced horizontal support members 140, 141 and 142. Extending transversely to the horizontal support members 140, 141 and 142 are side members 144, 145 and 146 to form the generally rectangular box-shaped frame 50 for the dies 54 and 55.

Because of the tremendous forces employed when moving the match dies during a molding operation, the frame 50 is strengthened by a series of vertical spacer and stiffener plates 148, FIG. 5, secured between the transverse end supports 144 and 145. As best seen in FIGS. 1 and 5, the respective hydraulic cylinders 57A, 57B and 57C are pivotally mounted at their rearward ends to individual ones of the support plates 148, and have their respective piston rods connected at their forward ends to triangular stiffener plates 150 on the rear wall 151 of the match dies 54 and 55.

Figure 7:
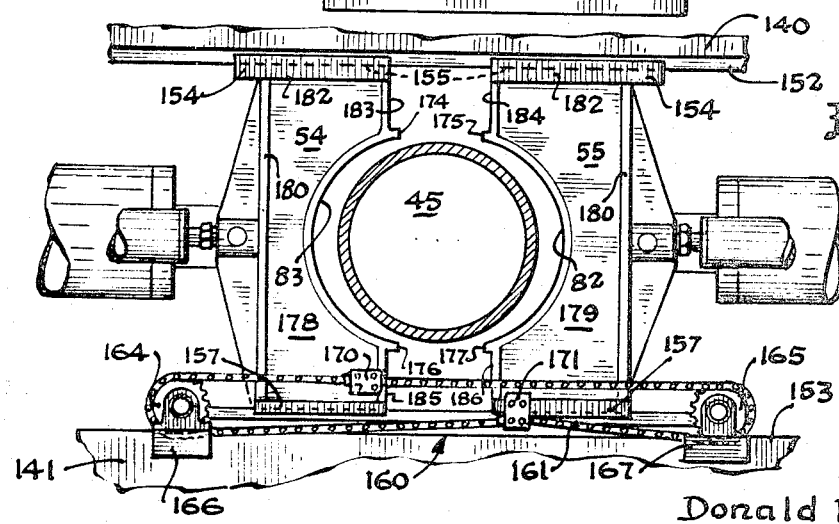
FIG. 7 shows a chain equalizing means and hydraulic cylinders for the matched press dies.

The match dies 54 and 55 are slidably mounted between the upper horizontal support member 140 and the intermediate horizontal support member 141, each of which is formed with a V-shaped guideway 152 and 153, respectively, FIG. 7. Each of the match dies 54 and 55 has thereon a longitudinally extending upper slide block 154 with a complementary shaped V-groove 155 for mating engagement with the upper V-shaped guideway 152.

Similarly, each of the lower portions of the respective match dies 54 and 55 has a transversely sliding block 157 with a V-shaped groove 158, FIG. 9, for sliding engagement along a V-shaped guiding and supporting surface 153 on the intermediate horizontal support member 141. Thus, the match die elements 54 and 55 are guided for reciprocal movement along a straight line path to present their respective curved surfaces 82 and 83, FIG. 7, in aligned and parallel relationship with the peripheral surface of the rotatable die 45.

While the respective hydraulic cylinders 56A, 56B, 56C and 57A, 57B and 57C are controlled simultaneously to effect movement of the respective match dies 54 and 55 toward one another, it is preferred that the extent of movement of the respective match dies 54 and 55 be assured of equal amounts of movement. For this purpose, the respective dies 54 and 55 are each connected to an equalizing means 160 which preferably includes an endless chain 161, FIGS. 6 and 7, extending between spaced sprockets 164 and 165 which are secured by brackets 166 and 167 to the horizontal intermediate support members 141.

The upper length of chain 161 is in turn secured to the match die 54 by an upper connecting lock 170 and the lower length of the chain 161 is secured by a lower block 171 to the die 55. Thus, it will be appreciated that the chain 161 serves to tie the movements of the respective dies 54 and 55 together so that each undergoes an equal increment of movement with movement of the other. It is to be understood that equalizers 160 are provided on both sides of the respective dies 54 and 55.

The curved arcuate plates 82 and 83 forming the compression surfaces for the composite material deposited on the die 45 are adapted to engage one another at their respective upper leading lips or edges 174 and 175, FIG. 7, and at the lower leading lips or edges 176 and 177. The tight closing engagement of the upper lips 174 and 175 of the dies 54 and 55 breaks the threads T, FIG. 11, freeing the carriage C for return movement to its initial position.

The curved die plates 82 and 83 are backed by series of vertical end plates 178 and 179, FIG. 7, and these in turn are secured to back plates 180 and the top plates 182. It is to be noted that the leading lips 174 and 175 project forwardly of the front plates 183 and 184 joining the die plates 82 and 83 to the respective top plates 182. Likewise, at the lower portion of the presser plate dies 54 and 55, flat vertical end plates 185 and 186 are provided.

For the purpose of affording a definite length to the molded part and to afford uniform molded end edges, it is preferred that the curved plates 82 and 83 of the pressing dies 54 and 55 each have an axial effective length bounded by a vertically extending shouldered surface 190, FIG. 10, at the stripper end of the molding station 46 and bounded by a like shouldered surface 191, FIG. 8, at the other end of the molding station. The shoulders 190 and 191 form outer semicylindrical collar portions 192 and 193 of increased thickness from recessed central portions of the plates 82 and 83 which engage and press the resin. The shoulders 190 and 191 are approximately ⅛ inch in depth, approximating the wall thickness of the mold article 10. The collars 192 and 193 on the respective die plates 82 and 83 are in contact with the peripheral surface of the die member 45 at the time of the curing operation. In the specific embodiment of the invention described herein, the distance between the respective shoulders 190 and 191 at the opposite ends of the respective curved plates 82 and 83 is approximately six feet. Therefore, the length of the finished molded article 10 is approximately six feet.

Turning now to a consideration of the carriage C, as best seen in FIG. 13 the carriage C includes a horizontal supporting frame 200 including a plurality of transversely extending support members 201 spanning end channels 202. Secured to the bottoms of the channels 202 are wheel brackets 203 in which are journaled wheels 204 which are confined to move in trackways 205 formed between a pair of upright and spaced guiding rails 206 and 207. Thus, it will be apparent that the carriage C is guided for reciprocal movement with the wheels 204 riding in the trackways 205.

For the purpose of driving the carriage C during its reciprocating movement, it is preferred that the driving means 210 include a driving motor 211, FIG. 13, for driving a pulley 212 which drives a belt 213 entrained about another pulley 214. The pulley 214 is connected to a gear reducer 215 which has a belt (not shown) for driving a rubber tire 218 which is in riding engagement with a flat metal plate 220 constituting an upper cover top plate for the transverse frame 50.

The carriage C is controlled to move forwardly above the rotatable die 45. As can be appreciated from FIG. 12, the carriage C is adapted to traverse the length of the rotatable die 45. While this occurs, thermosetting material R is deposited on the surface of the revolving die 45 and the threads T are wrapped in a spiral manner about the die 45.

The carriage C carries a plurality of cartons 222, FIG. 13, which contain coils of glass rovings 225. These rovings, each containing numerous glass filaments (as many as sixty ends per roving), are threaded through guide tubes 226 and are thereby guided across the carriage to another guide 227, FIG. 12, leading to a chopping or severing means 230. As best seen in FIG. 12A, the chopping means 230 preferably comprises a series of rubber faced discs 232 serving as a platen or supporting surface for the glass rovings 225 when the rovings are engaged by a severing drum 234 carrying a plurality of chopping blades 235.

The drum 234 is rotatably secured to a shaft 236. The rubber discs 232 are on a shaft 233 turned by an air motor 238, FIG. 12, pulling the rovings 225 into the bight between the rubber discs 232 and the chopping blades 235 on the drum 234. These blades break each of the strands of the rovings into short portions, i.e., fiber-like portions 74, which fall into a collecting chute 239 disposed beneath the discs 233 and drum 234. Since the rovings 225 are composed of a plurality of strands, a large number of glass choppings 74 of relatively small size are provided from only three collective rovings 225.

The respective rubber faced discs 232 and the cutting drum 234 are supported in cantilever fashion from a pair of bracket arms 240, FIG. 12, supported by fasteners 241 to the opposite sides of the chute 239. The bracket arms 240 have a bar 242 extending thereacross to which is secured a pair of supporting arms 244. The supporting arms 244 have fastened at their outer ends supporting disc plates 245 for the rubber discs 233.

For the purpose of separating the glass choppings 74 and forcing them downwardly through the collecting chute and funnel 75, an air hose 250, FIG. 12, has its discharge end disposed within the collecting chute 239. Thus, an air blast separates the glass choppings 74 which become oriented in a random manner. It has been found by experience that the glass fibers 74 impinging on the interior walls of the funnel 75 tend to collect static electricity which hinders the separation and dispersement of the fibers 74. To lessen the effect of static electricity, the funnel 75 is heated by a series of electrical resistance elements (not shown) embedded in an insulating sleeve wrapped about the funnel 75. The amount of heat is controlled by a heater regulator knob 253 on the collector chute 239. The funnel 73 is insulated so that the heat is directed to the interior wall of the funnel 75 against which impinge the glass fibers 75.

It will be recalled that the carriage C also carries the spools 70 of glass threads or filaments and directs the threads T from the three rows of spools 70, FIG. 13, to a position adjacent the rotating surface of the rotating die 45 for the spiral wrapping of the threads T about the die 45. To this end, the thread bobbins 70 are each mounted on a skewer as 255, FIG. 13, which are secured to either a supporting member 201 or 202.

The threads T from the spools 70 are threaded upwardly through wire guiding eyes 260 secured to extend beneath short guide frames 258 and 259. From the wire guiding eyes 260 the threads T run to and through apertures formed in a transverse, generally horizontal bar 262 of a medial and higher U-shaped frame 264. The threads T are then directed through guide openings in the upper surface 265 of the transverse bar 262, and from thence downwardly to a thread spacer guide 266, FIGS. 13 and 14.

The function of the guide 266 is to tension and align the threads T in a generally parallel vertical relationship with respect to a tangential point 268, FIG. 14, on the side of the rotatable die 45. As best seen in FIG. 14, the guide 266 includes an upper guide plate 270 which is apertured at 271 to receive the respective threads T. The threads T are guided from the apertures 271 through apertures 272 in an intermediate guide plate 273, and are brought around and beneath a guiding pin 274 into the bight between a pair of adjacent tension discs 275.

A plurality of tension discs 275 are mounted on a shaft 276. From the rearward side of the shaft 276 the threads T are lead downwardly and about the outer and forward surface of a guiding rod 278 and through an opening 279 in a final guide rod 280. The final guide rod 280 is adapted for vertical movement relative to the surface of the die 45 to position the threads in close proximity to the rotating die 45. The final guide rod 280 moves upwardly out of the path of movement of the match plate dies 54 and 55 during the pressing and curing operation.

The final guide rod 280 is mounted on a reciprocal frame 282 operable by a fluid cylinder means 285, FIG. 14. As best seen in FIGS. 12 and 13, the cylinder means 285 is vertically oriented and suitably secured at its upper and lower ends to a stationary vertical frame member 286 adjacent thereto. The frame member 286 is secured by triangular oriented angles 287 and 288 to the channels 202 and transverse support members 201 for the carriage C. The actuating cylinder means 285 has a piston rod 290 extending downwardly with its lower end 291 secured by a plate to the reciprocating frame 282 for the final guide rod 280.

The cylinder means 285 has a single acting cylinder in which fluid is adapted to be moved under pressure at the upper end through suitable fittings 295, FIG. 12, to drive the piston rod 290 downwardly to lower the final guide rod 280 to its position adjacent the die 45.

In addition to supporting the final thread guide rod 280, the reciprocating frame 282 has extending outwardly therefrom, in cantilever fashion, a pair of spaced arms 299 and 300. The spaced arms 299 and 300 are disposed on opposite sides of the discharging end of the funnel 75, and the mouth of the resin nozzle 72 is disposed between the arm members 299 and 300.

The arm members 299 and 300 support on their outer free ends a bar 302 which serves as a support for the resin nozzle 72 and the control valve 305 therefor. A series of air lines 306 and 307 are directed to the air valve 305 to turn on and off the resin nozzle 72 for controlling emission of resin R at predetermined times and predetermined rates of flow.

As best seen in FIG. 13, the arm 300 is secured to the traveling frame 282 by fasteners 309. A pair of contractile springs 310 are hooked between the respective arms 299 and 300 and the respective vertical supports 286 of the stationary thread guide 266. It will be recalled that the actuating cylinder 285 serves to drive its piston 290 and the reciprocal frame 282 downwardly. Upon release of fluid under pressure from cylinder 285, the contractile springs 310, now under tension, provide the lifting force to raise the reciprocal frame 282 and arms 299 and 300 upwardly above the surfaces of the respective match pressure dies 54 and 55 out of interference therewith during the pressing and curing operation.

The thread guide 266 is secured by spaced horizontal standoffs 315 and 316 to spaced vertical channel members 320, FIG. 12, which in turn are secured to the supports 286, 287 and 288.

The reciprocal frame 282 has opposed vertical rods 289, FIG. 13, which slide within channel members 320. Upward movement of the reciprocal frame 282, under the urging of the respective contractile spring 310, is limited by engagement of the respective arm members 299 and 300 with the lower edges 321 of the channel members 320. Conversely, the downward movement of the reciprocal frame 282 is limited by engagement of stop pins or studs 324, FIG. 13, secured to the vertical rods 286 with the upper edges 328 of the channel members 320.

For the purpose of adjusting the tension on the threads T, an adjusting nut 330, FIG. 13, may be turned on an adjusting stud 331 to compress a spring 332 which in turn bears on the plurality of tension discs 275 between which run the threads T. Thus, the amount of frictional resistance exerted on the threads by the tension discs 275 is controlled by turning the nut 330 to compress the spring member 332 bearing against the leftmost of the tension disc 275, as viewed in FIG. 13.

In order to facilitate an understanding of the apparatus disclosed herein for forming the molded article 10, a brief description is set forth below.

Figure 21:
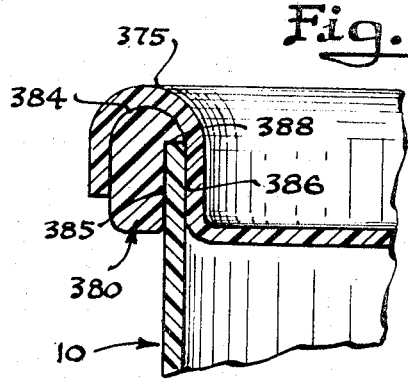
FIG. 21 illustrates the assembly of a cylinder, bead and cover to form a drum.

To begin the production of a molded article 10, FIGS. 4 and 21, the die 45 is advanced through stripper die 90 and into molding station 46. Simultaneously, cylinder 135 is energized to advance the driving carriage 60 to dispose the drive shaft 65 in the molding station 46, as seen in FIG. 9. The shaft 65 enters the opening 129 in the driven end 66 of die 44, and the splined collar 128 on shaft 65 engages with the complementary splined surface 130 at the end of the die 45, FIG. 4. The die 45 is supported for rotation at its left-hand end by the shaft 65 and motor drive carriage 60. At its right-hand end, the die 45 is supported for rotation by the shaft portion 104 of the stationary disc 105 which is now disposed in the stripper die 90 on wall 101.

The operator then causes the reciprocal frame 282 for the threads T and funnel 75 to lower adjacent the die 45. The threads T are gathered and tied to a hook (not shown) on the peripheral surface of the drum adjacent the point 268, FIG. 14.

The air motor 238 is set in operation to begin chopping the rovings 224 by the blade-carrying discs 236 as the rubber faced discs 233 are rotated by the air motor 238 to feed the rovings 224. The chopped glass rovings or fibers 74 are dispersed and scattered downwardly by air emitted by the hose 250 and move through the heated funnel 75 which curtails generation of static electricity. The fibers 74 fall on to the die 45 adjacent a position which has been previously wetted by the resin R emitting from the resin nozzle 72.

The die 45 is rotated by shaft 65 to bring the mixture of resin R and fibers 74 through a one-quarter revolution wherein the series of threads T compress and engage the fibers 74. It should be noted that the threads T become embedded within the matrix of resin R as well as the fibers 74, with fibers 74 disposed both on the outer and inner surfaces of the molded article as well as throughout the wall thereof.

The rate of movement of the carriage C is controlled to afford the desired density of deposited material, preferably for a wall thickness of ⅛ inch after cure. The rate of chopping of the rovings, flow of the resin R through the nozzle 72 and rate of rotation of the die 45 are also controlled to provide the desired deposition leading to the finished ⅛ inch wall thickness. The wall density is also controlled by the depth of the shouldered surfaces 190 and 193 which indicates the amount of cavity formed when the curved die plates 82 and 83 are brought about the die 45.

When the carriage C has moved across the die 45, the fluid in the hydraulic cylinder 285 for the reciprocal frame 282 is exhausted, whereupon springs 310 raise the frame 282 including the resin nozzle 72 and funnel 75. The air motor 238 for chopping the glass rovings is shut off.

The match press dies 54 and 55 are now moved into compressing relationship with the die 45 by directing fluid into the respective hydraulic cylinders 56A–56C and 57A–57C. The respective dies 54 and 55 slide along the upper guideways 152 and lower guideways 159 toward one another, the increments and rates of movement being equal as limited by the equalizing means 160 including the chain 161 connected to the respective match press dies 54 and 55.

As the upper leading edges 174 and 175 of the respective curved plates 82 and 83 are brought into engagement with one another, they break the threads T which were still secured to the die 45 after having been spirally wrapped thereabout. Forward inward movement of the respective dies 54 and 55 tightly closes the match dies at the leading edges 174 and 175. The curved surfaces 82 and 83 are in a generally concentric arrangement with the peripheral surface of the die 45, whereupon the heater elements in the presser dies 54 and 55 raise the resin to its curing temperature. In the preferred example, the amount of pressure applied by the respective dies 54 and 55 is approximately 320 pounds per square inch.

The spaced end surfaces 192 and 193 formed at the shoulder surfaces 190 and 191 on the curved surfaces 82 and 83 are in contact with the peripheral surface of the die member 45 while the intermediate main body portions of the curved die plates 82 and 83 compact and press the composite mixture of threads T, fibers 74 and resin R. Simultaneously, the temperature of the composite mixture is brought to the curing temperature while the pressure is being applied. The temperature and pressure may be adjusted to the particular type of cure required for the resin employed. It may also be pointed out that the threads T were wrapped in slight tension and the compression by the presser dies 54 and 55 relieves this tension. Thus, the molded wall has threads T therein which are no longer under tension.

After a predetermined time, the flow of hydraulic fluid is reversed in the respective actuating cylinders 56A–56C and 57A–57C, causing the respective dies 54 and 55 to open. The next step is stripping of the now-molded article from the die member 45.

For this purpose the hydraulic cylinder 43 is actuated to pull the die 45 outwardly through the brass-lined stripping die means 90 which engages the leading edge formed on the article 10 thereby preventing further movement of the article 10 with the die 45. Thus, the die 45 continues to be stripped from the molded article 10 until the die 45 is completely removed from the molding station 46, whereupon the molded article 10 is free for removal from the molding station 46.

After removal of the die 45, the driving shaft 65 may return on its carriage 60 to the position generally shown in FIG. 9. Also, the carriage motor 211 is caused to reverse the rotation of the rubber tire 218 to return the carriage C back to an initial position disposed adjacent the end wall 122 of the molding station 46.

The molded sleeve-like article 10 is employed, in the preferred embodiment of the invention, as the cylindrical body portion of a drum-like container which includes a lid or cover portion 375, FIG. 21. The lid 375 is joined to the cylinder 10 and held in position to close the ends of the cylinder sleeve 10 by means of a band or retaining ring 380. The cover 375 is generally circular-shaped, as shown in FIG. 17, and includes a central depressed portion 382 which is joined to an integral and inverted annular channel 384, FIG. 18, for receiving the ring 380 and the end portion of the cylindrical sleeve 10 when assembled, as shown in FIG. 21.

In assembling the bottom of the drum, the ring 380, FIG. 21, is disposed within the annular groove 384 and cemented therein. The ring 380 forms a receiving groove between its wall 385 and the opposed wall 386 on the cover 375 for the cylinder wall. A shoulder surface 388 on the ring 380 serves as a seat for the edge of the cylinder sleeve 10. The cylinder sleeve 10 is preferably cemented to both the ring 380 and cover 375 at the respective surfaces, 385, 386 and 388. When assembling the top of the drum, it is preferred to cement the ring 380 on the sleeve 10 and then place lid 375 thereon. Of course when it is desired to seal the drum and its contents, the top lid or cover 375 may be cemented or otherwise secured to the top ring 380.

Figure 15:
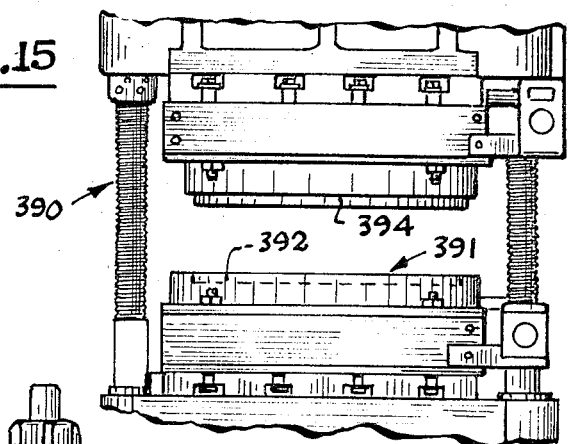
FIGS. 15 and 16 illustrate an apparatus for making the cover.
Figure 16:
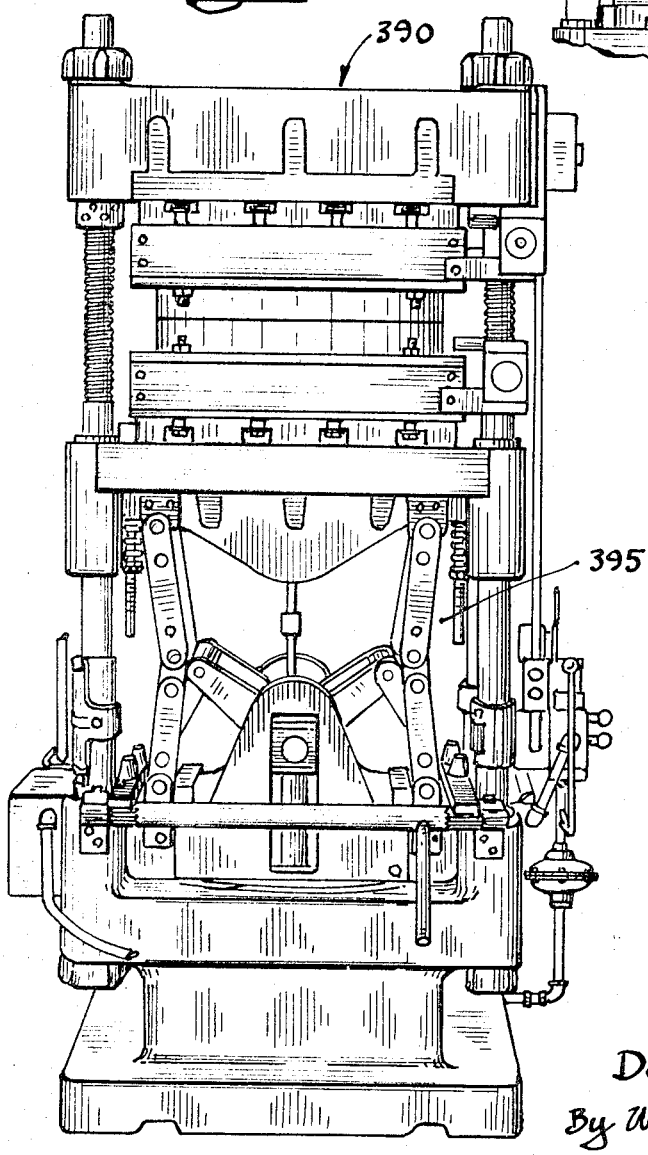

The cover 375 is preferably made of a thermosetting or plastic material reinforced with glass fibers. The glass fibers in the cover may be in the form of a preformed mat. The thermosetting or plastic material is injected into the glass mat arranged in a die press 390, FIGS. 15 and 16. The press 390 includes a lower platen 391 with a cavity 392 therein for receiving the mat of glass fibers. The platen or upper die 394 is lowered under the force of a toggle mechanism 395, FIG. 16, to close the die and exert considerable pressure on the thermosetting or plastic bonding material injected into the glass fiber mat. If a thermosetting resin is employed rather than a plastic material, the die is heated to provide necessary curing temperature.

Figure 17:
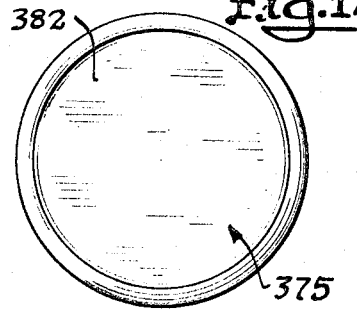
FIG. 17 is a plan view of the cover.
Figure 18:
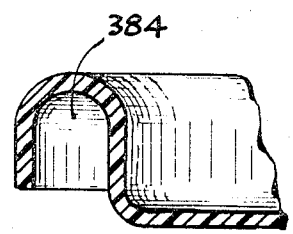
FIG. 18 is a sectional view of the cover.

Manifestly, the cavity 392 and upper die 394 are dimensioned to provide the wall thickness for the cover; for example, approximately ⅛ inch, and the dies are suitably formed to afford the cover configuration shown in FIGS. 17 and 18.

The ring or bead 380 is preferably formed with a large number of continuous strands of glass embedded in a thermoset material which is molded into the final ring shape. Preferably, the ring 380 includes 12 individual strands of roving of the sixty-end kind.

Figure 19:
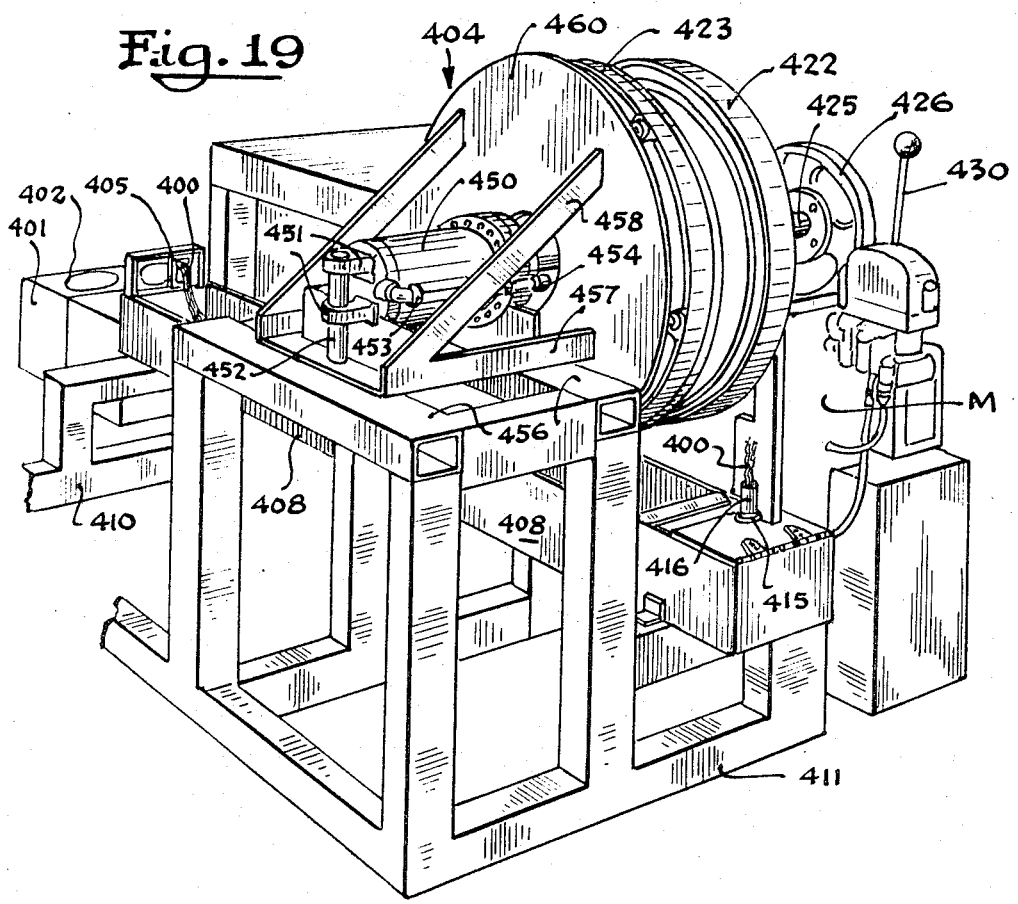
FIG. 19 is a perspective view of apparatus for making the retaining ring of FIG. 20.
Figure 20:
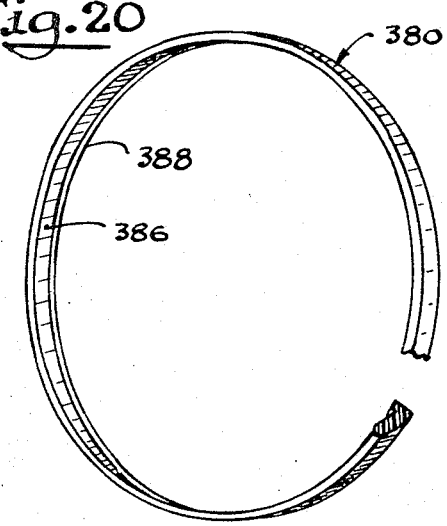
FIG. 20 is a perspective view of a retaining ring.

The glass rovings 400, FIG. 19, are disposed in a plurality of cartons or containers 401 in coil form 402 at the rear of the bead molding apparatus 404. The glass rovings are lead from the coil form 402 through a roller guide 405 into a resin-filled tank 408 which extends from the rear frame 410 to the front frame 411. The resin tank 408 is a long, trough-like member through which the glass rovings are drawn and coated with resin prior to leaving the resin tank 408 at the forward end thereof.

At the forward end of the tank 408 there is provided a drawing die 415 which is adapted to compress the rovings into a highly compacted cylindrical configuration about the size and diameter of a pencil as the rovings exit the upper end 416 of the drawing die 415. The resin-covered rovings 400 are then wrapped about and disposed in the inlet cavity 420, FIG. 24, between a heated die 422 and an axially movable die 423.

The heated die 422 is rotatably mounted on a horizontal shaft 425, FIG. 22, which is journaled in support bearings 426 on a cross frame member 428. The rotatable shaft 425 is connected to a pulley 426, which is driven by a belt connected to a motor M, FIG. 19, disposed therebeneath. A control lever 430 is adapted to control the rotation of the dies 422 and 423 by the driving shaft 425 and also the positions of the die members 422 and 423 in the axial direction.

The resin employed is preferably a polyester resin which is cured under heat and pressure. The heat for molding the polyester resin is afforded by a plurality of resistant heater elements 432, FIG. 24, embedded in an insulating ring 433 immediately behind the die cavity 435 in the heated die member 422. More specifically, the insulated ring 433 is an annular member secured by suitable fasteners 436, FIG. 22, to the heated die member 422. As also seen in FIG. 22, an annular contact ring 438 is contacted by brushes 439 to supply the input power for the electrical resistant elements 432 during the rotation of the heated die 422. The curing temperature for the polyester resin is approximately 250° F., with the catalyst employed in the preferred embodiment of the invention. The curing takes place during rotation of the dies 422 and 423. The rovings 424 are severed and the final cure rotations are completed.

As best seen in FIG. 24, the heated die 422 is adapted for engagement with the compressing die 423 about an annular ring portion 440 on the heated die 422. When the compression die 423 is fully seated with respect to the heated die 422, an annular surface 442 on the die 423 is in engagement with the shoulder surface 443 on the heated die 422. The compression die 423 has a metallic, inner die plate 445 which is secured to an outer ring support plate 446 by fasteners (not shown). Between the plates 445 and 446 is secured an insulating plate 447. The insulating plate 447 serves to retain the heat within the die cavity during the curing operation. The pressure needed for cure of the polyester resin on the rovings 400 is afforded at least in part by the tension of drawing the rovings 400 from the drawing die 415 as the rovings are pulled therefrom with rotation of the dies 422 and 423.

For the purpose of axially moving the die 423, a fluid cylinder means 450, FIG. 19, is pivotally mounted by spaced bracket arms 451, FIG. 19, to a vertical support post 452. The cylinder 450 is double acting and has respective conduits 453 and 454 leading thereto. The post 452 is secured to a table or bench-like support form by members 456 which is turn support brace members 457 and 458 secured to the backup plate 460.

The backup plate 460 is a stationary member against which a series of knockout pins 462 are engaged, FIGS. 22 and 23, to knock the molded ring 380 from the circular cross-section cavity 464 in the die plate 445. The knockout pins 462 are each threaded on a spring cap member 465, FIG. 24, in which is seated a compression spring 466, FIG. 24. The back plate 446 has a series of semicircular openings 468 disposed along its outer edge in which are disposed spring retainers 469 of generally cylindrical configuration, FIG. 24. The spring retainers 469 retain the springs 466 and are welded or otherwise secured to the insulating plate 447.

The ejector pins 462 are circumferentially disposed about the periphery of the compression die member 422 and are normally biased by the compression springs 466 so that the inner tips or ends 470 are at the bottom surface of the circular groove 464 in the compression die 423. The knockout pins 470 are disposed in apertures 471, FIG. 24, in the die plate 445 to prevent entrance of fluid under pressure into the apertures 471. Suitably aligned apertures 472 and 473, FIG. 24, are also disposed in the respective insulating plate 447 and in alignment with the apertures 471 for receiving the respective knockout pins 462.

After the cylinder means 450 has been actuated to the position of FIGS. 23 and 24, with its piston rod 475 extended, and after the retaining ring 380 has been molded, fluid under pressure is directed into the reversing conduit 454 to retract piston rod 475, and thereby the compression die 423 moves to bring the knockout pins 462 into engagement with the backup plate 460. Further retraction movement of the piston 475 pulls the compression die 423 closer to the backup plate 460 while the now-stationary ejector pins 462 have their forward ends 470 projected into the groove 464, forcing the head 380 outward of the groove 464. Thus, the bead 380 is ejected by the knockout pins 462.

It will be realized that the compression die 423 is spaced away from the heated die 422 when this ejecting operation takes place, as best seen in FIG. 22. Thus, considerable room is provided for removal of the now-finished bead 380.

From the foregoing it will be seen that the present invention affords a unique apparatus and process for producing a cylinder or the like having composite walls including glass reinforcing materials therein. The body of the cylindrical portion of the molded article is produced in an automatic match plate press die operation wherein chopped glass rovings or fibers are disposed in a matrix of thermosetting resin and into which are disposed a plurality of strands wound in a convolute manner about the peripheral wall. The present invention also affords a unique apparatus for forming other portions of a molded article such as a container also having reinforced glass fibers therein.

It is to be understood that the cylindrical article 10 discussed and illustrated herein could be of other configurations. More specifically, the rotatable die 45 could have a square cross-section to form containers with flat walls. Also, the walls of the rotatable die 45 could be tapered to afford a molded article having tapered walls. Other configurations and different materials are also possible and within the purview of the present invention.

Hence, while I have illustrated and described a preferred embodiment of my invention, it is to be understood that this is capable of variation and modification.

I claim:

1. In an apparatus for producing a molded hollow article having walls composed of a settable bonding material which is reinforced with other materials including randomly oriented fibers and strands wound thereabout, said apparatus comprising: a molding station having a centrally located die and a plurality of matching dies presenting engageable mating edges on opposite sides of said first-mentioned die and cooperating therewith to define a mold cavity for said materials; said matching dies sized to cover the entire outer surface of the article as formed on the centrally located die, means for traversing said first-mentioned die and dispensing thereon said fibers and said bonding material and for winding said strands under tension thereabout on said first-mentioned die between the open matching dies; means for closing said matching dies relative to the first-mentioned die to complete said mold cavity about the materials deposited on said first-mentioned die; closure of said matching dies to engage said edges resulting in breaking of the strands at the unused length, thereby releasing said tension and enabling compression molding to be realized; said means for closing said matching dies causing same to engage the entire outer surface of the formed article at the same time and to apply thereto a pressure of approximately 320 pounds per square inch; and stripper means for stripping the molded article from said first-mentioned die.

2. In an apparatus as defined in claim 1, wherein said traversing means includes a carriage for supplying fiber-like glass elements and continuous glass filaments to said centrally located die.

3. In an apparatus as defined in claim 2, means on said carriage for applying the bonding material to said first-mentioned die, and means on said carriage for separating glass rovings into fibers and depositing the same on said centrally located die simultaneously with said thermosetting material.

4. The apparatus of claim 3 including a chute for collecting said separated glass rovings, said apparatus including means providing air under pressure for fluffing said separated rovings and for forcing the same through said chute.

5. In an apparatus as defined in claim 1, and equalizer means extending between said matching dies for assuring equalized increment movements of said matching dies toward said centrally located die.

6. The apparatus of claim 5 wherein said equalizing means includes endless bands secured between said matched die means, movement of said endless bands assuring an equal amount of movement of the respective opposed matched die means.

7. In an apparatus for producing a molded hollow article having walls composed of a thermosetting bonding material reinforced with other materials including randomly oriented glass fibers and strands of glass fiber wound thereabout, said apparatus comprising: a molding station having a rotatable die and a plurality of opposed normally open matching dies having matching edges and cooperable therewith to define a mold cavity for said materials when closed; said matching dies sized to cover the entire outer surface of the article as formed on the centrally located die; means to rotate said rotatable die; carriage means for traversing axially along said rotatable die, and means associated therewith for depositing glass fibers and the thermosetting material on said rotatable die and for winding said glass strands under tension about said rotatable die; means for closing said opposed matching dies to confine said materials on said rotatable die; closure of the matching edges of the dies breaking the strands at the unused length, releasing said tension and enabling compression molding to be realized; said means for closing said matching dies causing same to engage the entire outer surface of the formed article at the same time and to apply thereto a pressure of approximately 320 pounds per square inch; means to heat said thermosetting material while confined as aforesaid to cure said thermosetting material; and stripper means for stripping the resultant molded article from said rotatable die.

8. In an apparatus for producing a hollow molded article, rotatable die means, means to fiberize continuous glass rovings and deposit them on said rotatable die means, means to supply thread-like strands to said rotatable die means, means to connect said strands to said rotatable die means and to enable the strands to be wrapped thereabout under tension upon rotation of said rotatable die means, means to apply a settable bonding material in a liquid state to said fiberized rovings and said strands on said rotatable die means, means including normally open matched dies for confining upon closure thereof said fiberized rovings, threads and bonding material on said die to form said article said matching dies sized to cover the entire outer surface of the article as formed on the centrally located die, means for closing said matched dies, closure of said matched dies breaking the strands at the unused length, thereby releasing the tension on the wrapped strands and enabling compression molding to be realized, said means for closing said matching dies causing some to engage the entire outer surface of the formed article at the same time and to apply thereto a pressure of approximately 320 pounds per square inch.

9. In apparatus for producing a molded drum, a rotatable die of cylindrical configuration, means to deposit fibers on said rotatable die, means to supply strands to said rotatable die on which the fibers are deposited, means to connect said strands to said rotatable die to be wrapped thereabout under tension upon rotation of said rotatable die; means to apply a thermosetting bonding material in liquid form to said fibers and said strands on said rotatable die, a pair of normally open opposed match dies, said match dies having engageable edges and each having a curved surface thereon forming a concentric arrangement about said rotatable die, and sized to cover the entire surface of the drum as formed on the rotatable die, means to close said match dies relative to said rotatable die to confine said fibers, strands and thermosetting material on the rotatable die, engagement of said edges breaking the strands at the unused length thereof thereby releasing the tension of the wrapped strands and enabling compression molding to be realized, said means for closing said match dies causing same to engage the entire outer surface of the formed drum at the same time and to apply thereto a pressure of approximately 320 pounds per square inch, means to cure said thermosetting material, and means for stripping the molded article from said rotatable die.

10. In an apparatus for molding a cylindrical article composed of reinforced glass elements, said apparatus comprising: a molding station, a rotatable cylindrical die at said molding station, a stripper for stripping said molded article from said rotatable die, said rotatable die being movable through said stripper into and from said molding station, drive means disposed opposite said stripper at said molding station and movable into driving engagement with said die, an overhead carriage for supplying thermosetting bonding material and glass fibers to said die, said overhead carriage being transversely movable across said molding station while said rotatable die is being rotated and having means for wrapping continuous glass filaments under tension in a spiral manner about the glass fibers and bonding material fed to said rotatable die, a pair of matched die means disposed on opposite sides of said rotatable die and movable in a direction normal thereto, each of said matched die means having a curved and recessed die plate concentric with said cylindrical die means and movable to a position closed on one another to confine the materials on said rotatable die, said matching die means sized to cover the entire outer surface of the article as formed on the rotatable die, means for closing said matched die means, closure of said die means breaking the strands at the unused length thereby releasing said tension and enabling compression molding to be realized, said means for closing said matched die means causing same to engage the entire outer surface of the formed article at the same time and to apply thereto a pressure of approximately 320 pounds per square inch, and means to heat said thermosetting material to cure said thermosetting material while confined on the rotatable die.

11. The method of making a hollow, molded article having a wall of glass fibers, strands of glass and a thermosetting bonding material, comprising the steps of:
  (a) applying thermosetting bonding material and short-length glass rovings to a rotatable die member;
  (b) wrapping glass strands under tension about said bonding material and glass rovings on the rotatable die;
  (b1) breaking the unused length of the strands by closing a pair of matched die members sized to cover the entire outer surface of the article thereon to release the tension in the wrapped strands and confining said rovings, untensioned strands and thermosetting bonding material to a pressure on the outer surface thereof of approximately 320 pounds per square inch; and
  (c) subjecting said rovings, untensioned strands and thermosetting bonding material to heat while confined on said rotatable die by said members which produce compression molding.

12. The method of molding hollow articles having walls of glass fibers, glass strands and a bonding material upon a rotatable die,
  (a) chopping strands of glass rovings into glass fibers;
  (b) directing the glass fibers to the surface of the rotatable die;
  (c) applying bonding material to said rotatable die;
  (d) feeding a plurality of glass threads to said rotatable die;
  (e) wrapping said threads under tension about the bonding material and glass fibers on said rotatable die;
  (e1) breaking the unused length of the strands by closing thereon a pair of matched die members to thereby release the tension in the wrapped strands and confine the materials on the rotatable die for compression molding; confining said rovings, untensioned strands and thermosetting bonding material to a pressure on the outer surface thereof of approximately 320 pounds per square inch;
  (f) applying heat to the bonding material, glass fibers and glass strands confined as aforesaid thereby to complete a molded article; and
  (g) stripping said molded article from said rotatable die member.

References Cited

UNITED STATES PATENTS

| | | | |
|---|---|---|---|
| 1,251,175 | 12/1917 | Boyer | 18—2 XR |
| 2,059,387 | 11/1936 | Nanfeldt | 18—17 |
| 2,428,654 | 10/1947 | Collins | 161—141 |
| 2,455,215 | 11/1948 | Beckwith et al. | 156—196 XR |
| 2,614,058 | 10/1952 | Francis | 156—172 XR |
| 2,718,583 | 9/1955 | Noland et al. | 156—172 XR |
| 2,814,329 | 11/1957 | Sitton | 156—429 XR |
| 3,006,402 | 10/1961 | Ferla | 156—443 XR |
| 3,226,273 | 12/1965 | Becker | 156—429 XR |
| 3,278,993 | 10/1966 | Brayman et al. | 18—34 |
| 3,379,591 | 4/1968 | Bradley | 156—173 |

EARL M. BERGERT, *Primary Examiner.*

R. A. KILLWORTH, *Assistant Examiner.*

U.S. Cl. X.R.

156—429; 264—310